US012705079B2

(12) United States Patent
Choi et al.

(10) Patent No.: US 12,705,079 B2
(45) Date of Patent: Aug. 11, 2026

(54) SYSTEM FOR CONTROLLING USER DEVICES FOR ENHANCING PERSONALITY AND EMOTIONAL RESILIENCE

(71) Applicant: CognoMetric InnoLab, Inc., San Jose, CA (US)

(72) Inventors: Steven Seungwook Choi, Gwacheon (KR); Kilchan Choi, Potomac, MD (US); Kyusik Roh, Seoul (KR); Jinok Kim, Potomac, MD (US)

(73) Assignee: CognoMetric InnoLab, Inc., San Jose, CA (US)

( * ) Notice: Subject to any disclaimer, the term of this patent is extended or adjusted under 35 U.S.C. 154(b) by 0 days.

(21) Appl. No.: 19/061,193

(22) Filed: Feb. 24, 2025

(65) Prior Publication Data

US 2025/0272123 A1 Aug. 28, 2025

(51) Int. Cl.

| | |
|---|---|
| ***G06F 9/451*** | (2018.01) |
| ***G06F 3/16*** | (2006.01) |
| ***G10L 25/63*** | (2013.01) |

(52) U.S. Cl.

CPC .............. *G06F 9/453* (2018.02); *G06F 3/167* (2013.01); *G10L 25/63* (2013.01)

(58) Field of Classification Search

CPC .......... G06F 9/453; G06F 3/167; G06F 40/30; G06F 19/00; G10L 25/63; G06V 40/20; G06Q 20/3224; G06Q 10/063118; H04N 21/278; A61B 5/0022; A61B 5/0205; A61B 5/165; A63F 13/34

See application file for complete search history.

(56) References Cited

U.S. PATENT DOCUMENTS

| | | | | |
|---|---|---|---|---|
| 9,721,066 | B1 * | 8/2017 | Funaro | G16H 40/63 |
| 11,232,393 | B1 * | 1/2022 | Kim | H04W 4/029 |
| 2018/0350144 | A1 * | 12/2018 | Rathod | G06Q 20/3224 |
| 2019/0205148 | A1 * | 7/2019 | Schur | G06F 9/453 |
| 2020/0364588 | A1 * | 11/2020 | Knox | G06V 40/20 |
| 2022/0086393 | A1 * | 3/2022 | Peters | H04N 7/147 |
| 2022/0132214 | A1 * | 4/2022 | Felman | H04N 21/278 |
| 2022/0331028 | A1 * | 10/2022 | Sternitzke | A61B 5/1176 |

(Continued)

FOREIGN PATENT DOCUMENTS

| | | | | |
|---|---|---|---|---|
| AU | 2012329088 A1 * | 5/2014 | | A61B 5/165 |
| CA | 3069511 A1 * | 1/2019 | | G07C 5/008 |
| CA | 3105652 A1 * | 1/2020 | | A61B 5/0205 |

(Continued)

*Primary Examiner* — Steven P Sax

(74) *Attorney, Agent, or Firm* — Polygon IP, LLP

(57) ABSTRACT

A platform that includes server devices and databases may coordinate operation of electronic devices for performance of operations to increase certain personality or emotional traits. The platform may select and provide data utilizing a pre-set template to one or more user devices to determine characteristics of the user or to increase the user's performance in certain categories. For example, the platform may communicate data to electronic devices to aid in the user performing certain operations. The operations may be configured to enhance a quotient determined by the platform, which is tracked and utilized to refine further operations. Accordingly, the platform aids in child raising and education utilizing user electronic devices in a resource efficient manner.

16 Claims, 10 Drawing Sheets

(56) References Cited

U.S. PATENT DOCUMENTS

2023/0058835 A1* 2/2023 Ahluwalia ..... G06Q 10/063118

FOREIGN PATENT DOCUMENTS

| | | | | | |
|---|---|---|---|---|---|
| CA | 2930412 | C | * | 6/2021 | G06F 19/00 |
| CA | 3164001 | A1 | * | 7/2021 | A61B 5/0022 |
| CA | 3207044 | A1 | * | 9/2022 | G06F 40/30 |
| CN | 108292995 | A | * | 7/2018 | G06Q 30/02 |
| CN | 113727765 | A | * | 11/2021 | A63F 13/34 |
| EP | 3739356 | A1 | * | 11/2020 | B60L 50/20 |
| KR | 20140035031 | A | | 3/2014 | |
| KR | 102223067 | B1 | * | 3/2021 | H04W 4/023 |
| KR | 2609207 | B1 | * | 12/2023 | |
| KR | 20240009318 | A | * | 1/2024 | |
| TW | 202234304 | A | * | 9/2022 | |
| WO | WO-2022183138 | A2 | * | 9/2022 | G10L 25/63 |

* cited by examiner

SYSTEM FOR CONTROLLING USER DEVICES FOR ENHANCING PERSONALITY AND EMOTIONAL RESILIENCE

CROSS-REFERENCE TO RELATED APPLICATIONS

This application claims the benefit under 35 U.S.C. § 119 of Korean Patent Application No. 10-2024-0029088, entitled "Achievement Index Measurement Methods and Systems", filed on Feb. 28, 2024, and Korean Application No. 10-2024-0029089, entitled "Achievement Index Measurement Methods and Systems", filed on Feb. 28, 2024, which are both incorporated herein by reference in their entireties for all purposes.

FIELD OF TECHNOLOGY

This patent application relates generally to systems for coordination of electronic devices and, more specifically, to database systems that provide for coordination of a plurality of electronic devices for performance of determined operations for development of personality and/or emotion resilience.

BACKGROUND

Training and raising of children has been a long-standing concern and topic of interest for humanity since its inception. However, it is now widely recognized that there is no single correct answer to this question as differences in individuals, circumstances, environments, societal contexts, and historical contexts make it impossible to find one definitive answer.

Low academic achievement is often rooted in factors beyond a student's aptitudes, but the underlying causes are frequently overlooked or ignored. Between 2016 and 2019, approximately 20 million children aged 3 to 17 were diagnosed with attention-deficit/hyperactivity discord ("ADHD"), anxiety, depression, or other behavioral issues. In 2021, 14.9% of children aged 5 to 17 received mental health treatment, with 8.2% taking medication and 11.5% receiving counseling or therapy. Additionally, nearly 80% of children were adversely affected by the COVID-19 pandemic and lockdowns. Remote learning during lockdowns added to mental challenges, leading to proportional declines in academic performance and school engagement.

Though technological progress has allowed for electronic devices to become increasingly more powerful, raising of children, especially in a time and resource efficient manner, has continued to be a challenge.

SUMMARY

Described are methods and systems for operation of a system of electronic devices for performance of determined operations to enhance personality and emotional resilience.

Clause 1. A system comprising: a device coordinator platform, comprising: a template module, configured to store one or more pre-set templates; an interactive sequence module, configured to: access the template module to obtain a first pre-set template; create a first interactive sequence, based on the first pre-set template; provide the first interactive sequence to a first user device, the first user device comprising a first user interface; and receive first interactive reply data from the first user device based on the first interactive sequence; a capability module, configured to: determine, based on the first interactive reply data, a first quotient associated with a first user associated with the first user device; and store the first quotient; and an operation module, configured to: determine a first operation sequence based on the first quotient, wherein the first operation sequence is configured to be executed in a cooperative mode; provide first device first operation sequence data to the first user device, the first device first operation sequence data associated with the first operation sequence; receive first location data from the first user device and second location data from a second user device associated with the first user device; and provide, based on the first location data and the second location data, first guidance data to the first user device and second guidance data to the second user device, wherein the first guidance data is configured to aid in execution of the first operation sequence.

Clause 2. The system of clause 1, wherein the first interactive sequence is configured to cause the first user interface to communicate the first interactive sequence.

Clause 3. The system of clause 2, wherein the interactive sequence module is further configured to: access the template module to obtain a second pre-set template to create a second interactive sequence, based on the second pre-set template; provide the second interactive sequence to the second user device; and receive second interactive reply data from the second user device based on the second interactive sequence.

Clause 4. The system of clause 3, wherein the second interactive sequence is configured to cause a second user interface of the second user device to communicate the second interactive sequence.

Clause 5. The system of clause 1, wherein the providing the first guidance data and the second guidance data is based on determining, based on the first location data and the second location data, that the first user device and the second user device are disposed within a threshold distance.

Clause 6. The system of clause 1, wherein the operation module is further configured to: provide second device first operation sequence data to the second user device, the second device first operation sequence data associated with the first operation sequence.

Clause 7. The system of clause 1, wherein the operation module is further configured to: receive user interface data from the first user device, the user interface data generated during execution of the first operation sequence, wherein the user interface data is stored within the operation module to aid in determination of further operation sequences.

Clause 8. The system of clause 7, wherein the user interface data comprises microphone data of the first user device.

Clause 9. The system of clause 7, wherein the operation module is further configured to: determine, based on the user interface data, a state of the first user.

Clause 10. The system of clause 9, wherein: the operation module is further configured to: receive execution data from the first user device, the execution data associated with the first operation data; determine, based on the execution data, an execution result; and provide the execution result and the determined state to the capability module; and the capability module is further configured to: determine, based on the execution result and the determined state, a second quotient associated with the first user.

Clause 11. A method comprising: storing one or more pre-set templates within a template module; accessing, with an interactive sequence module, the template module to obtain a first pre-set template; creating, with the interactive sequence module, a first interactive sequence based on the first pre-set template, providing the first interactive sequence to a first user device, the first user device comprising a first user interface; receiving first interactive reply data from the first user device based on the first interactive sequence; determining, based on the first interactive reply data, a first quotient associated with a first user associated with the first user device; storing the first quotient; determining a first operation sequence based on the first quotient, wherein the first operation sequence is configured to be executed in a cooperative mode; providing first device first operation sequence data to the first user device, the first device first operation sequence data associated with the first operation sequence; receiving first location data from the first user device and second location data from a second user device associated with the first user device; and providing, based on the first location data and the second location data, first guidance data to the first user device and second guidance data to the second user device, wherein the first guidance data is configured to aid in execution of the first operation sequence.

Clause 12. The method of clause 11, wherein the first interactive sequence is configured to cause the first user interface to communicate the first interactive sequence.

Clause 13. The method of clause 12, wherein the interactive sequence module is further configured to: access the template module to obtain a second pre-set template to create a second interactive sequence, based on the second pre-set template; provide the second interactive sequence to the second user device; and receive second interactive reply data from the second user device based on the second interactive sequence.

Clause 14. The method of clause 13, wherein the second interactive sequence is configured to cause a second user interface of the second user device to communicate the second interactive sequence.

Clause 15. The method of clause 11, wherein the providing the first guidance data and the second guidance data is based on determining, based on the first location data and the second location data, that the first user device and the second user device are disposed within a threshold distance.

Clause 16. The method of clause 11, further comprising: providing second device first operation sequence data to the second user device, the second device first operation sequence data associated with the first operation sequence.

Clause 17. The method of clause 11, further comprising: receiving user interface data from the first user device, the user interface data generated during execution of the first operation sequence, wherein the user interface data is stored within an operation module to aid in determination of further operation sequences.

Clause 18. The method of clause 17, wherein the user interface data comprises microphone data of the first user device.

Clause 19. The method of clause 17, further comprising to: determining, based on the user interface data, a state of the first user.

Clause 20. The method of clause 19, further comprising: receiving execution data from the first user device, the execution data associated with the first operation data; determining, based on the execution data, an execution result; providing the execution result and the determined state to a capability module; and determining, based on the execution result and the determined state, a second quotient associated with the first user.

These and other examples are described further below with reference to figures.

BRIEF DESCRIPTION OF THE DRAWINGS

The included drawings are for illustrative purposes and serve only to provide examples of possible structures and operations for the disclosed inventive systems, apparatus, methods, and computer program products for operation of a system of electronic devices for performance of determined operations to enhance personality and emotional resilience. These drawings in no way limit any changes in form and detail that may be made by one skilled in the art without departing from the spirit and scope of the disclosed implementations.

DETAILED DESCRIPTION

Described herein are systems and techniques for directing and coordinating operation of electronic devices for performance of determined operations to increase certain personality and/or emotional traits. In various embodiments, a platform may select and provide a pre-set template to one or more user devices and receive reply data from the one or more user devices. The platform may determine a quotient associated with a user of the user device. The platform may then select and provide an operation to the one or more user device to be presented to the user.

In certain embodiments, the operation may be configured to enhance the quotient determined by the platform. Such a quotient may be associated with a personality and/or emotional resilience of a user. Such a quotient may, for example, be associated with children and may be utilized during the education and/or upbringing of children to, for example, increase their personality or emotional resilience. Thus, the systems and techniques described herein allow for configuring and operating user devices that are utilized for enhancing various capabilities of children. The operation of the user devices may be in real-time and may provide for more resource efficient operation of such user devices. The systems and techniques described herein thus provide for electronic devices that aid in child raising and education in a resource efficient manner.

It is appreciated that, for the purposes of this disclosure, when an element includes a plurality of similar elements distinguished by a letter or follow-on numeral following the ordinal indicator (e.g., "140A" and "140B") and reference is made to only the ordinal indicator itself (e.g., "140"), such a reference is applicable to all similar elements.

Electronic Device System

Figure 1:
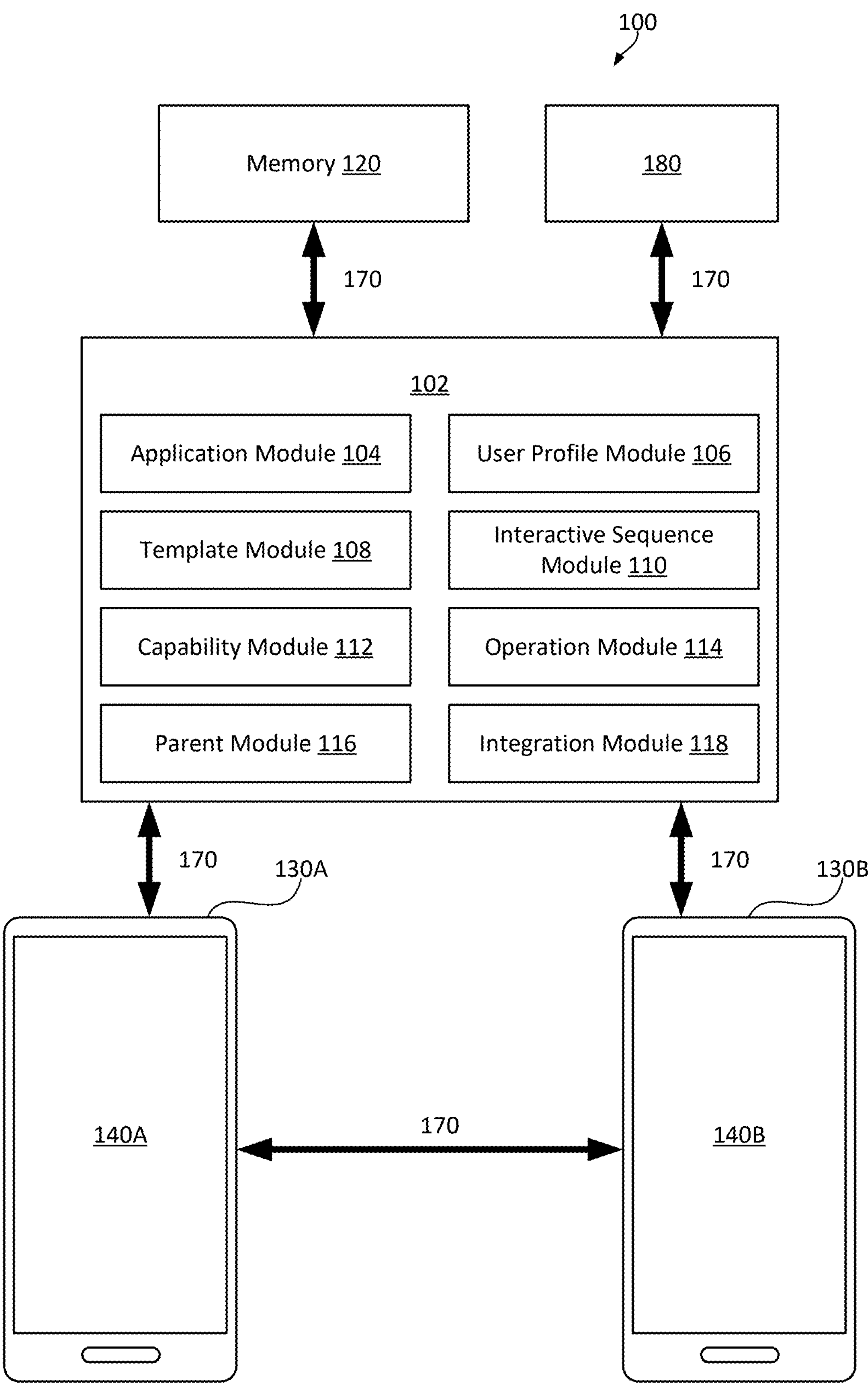
FIG. 1 illustrates a block diagram of an example system, in accordance with certain embodiments.

FIG. 1 illustrates a block diagram of an example system, in accordance with certain embodiments. FIG. 1 illustrates system 100 that includes platform 102, memory 120, user device 130A, user device 130B, and user device 180.

Memory 120 may be a memory configured to store various determinations and/or other data performed by platform 102. In various embodiments, memory 120 may provide storage for data from various modules of platform 102 (e.g., for data generated by the various modules) and/or one, some, or all such modules may include their own memory storage, as described herein.

User device 130 may be an electronic device utilized by a user (e.g., a child or parent) of platform 102. In various embodiments user device 130 may include one or more of a smartphone, a computer, a laptop, a wearable device, and/or another such device that provides the capability for a user to provide inputs that may be provided as data to be communicated to platform 102 as well as receive data from platform 102 that may, for example, be provided as outputs by user device 130. Thus, user device 130 may include a user interface 140. User interface may be one or more of a graphical interface (e.g., a screen configured to display a GUI and/or a keyboard), a keyboard, a microphone, an audio interface (e.g., a speaker), a haptic feedback device, and/or another such interface that may receive input from and/or provide output to the user of user device 130. User device 130 may also include one or more biometric or input devices, such as microphones, biometric sensors (e.g., heart-rate sensors), cameras, and/or other such input devices.

In various embodiments, user device 130 may include one or more applications (e.g., software) and may be communicatively coupled to platform 102. Such applications may, for example, receive data from platform 102 to provide an interactive sequence (also referred to as a "questionnaire") for answer by the user and/or provide an operation for the user to perform, may track the performance of the operation, and/or may provide for determination of cooperation between a plurality of different user devices, such as user device 130A and 130B. Accordingly, in various such embodiments, user device 130A may, for example, be a user device of a child and user device 130B may, for example, be a user device of a parent of the child.

User device 130A, user device 130B, and/or memory 120, as well as other devices, processors, and/or memories, may be communicatively coupled to platform 102 via communications interface 170. In various embodiments, communications channel 170 may be any wired and/or wireless data connection, such as, for example, a wired Ethernet connection or a wireless data connection such as WiFi, 3G, 4G, 5G, or another such connection that allows for data to be transmitted. In various embodiments, the various portions of platform 102 described herein may utilize one, some, or all such data connections to communicate and/or receive the various data described herein, including portions not illustrated to be communicatively coupled via communications channel 170. For example, the different modules of platform 102 may also be communicatively coupled via communications channel 170 in addition to user device 130A, user device 130B, and memory 120.

Platform 102 may be a platform for receiving data from and providing data to user device 130A and user device 130B. In various embodiments, platform 102 may include various modules. Thus, for example, platform 102 may include application module 104, user profile module 106, template module 108, interactive sequence module 110, capability module 112, operation module 114, parent module 116, and integration module 118. In various embodiments, platform 102 may be provided by one or more server devices and/or other such devices that, for example, provide for back-end services for user device 130. In various embodiments, platform 102 and/or one or more modules of platform 102 may include processors, memory, databases, communications circuitry or devices, and/or other components to allow the respective module to provide the functionality described herein. Various modules described herein may include electronic circuitry configured to search, access, and communicate such data to other portions (e.g., other modules) of platform 102.

Application module 104 may be configured to store and provide data related to an application installed on user device 130. Such an application may be associated with rating and development of personality and/or emotional aspects of children, according to the techniques described herein. In various embodiments, application module 104 may provide various Application Programming Interfaces (APIs) for communication with user device 130 as well as performing the techniques described herein (e.g., for techniques that are performed by third parties).

User profile module 106 may be configured to store and provide data related to various users of various user device 130. That is, user profile module 106 may include a database configured to store a user's (e.g., a parent or a children's) baseline health data, age, biological sex, weight, personality data, emotional data, questionnaire answers and/or operation results, and/or other such data.

In various embodiments, user profile module 106 may be configured to store such data associated with a plurality of different users (e.g., a plurality of different children) in a secure manner that separates the data from the different users. Thus, for example, data of different users may be separately stored in a secure manner. In certain embodiments, user profile module 106 may be configured to store and provide historical data of a user. Therefore, user profile module 106 may be configured to store historical data to allow for the determination of, for example, the progress of a child. Additionally, user profile module 106 may be configured to store biometric data of the user to, for example, provide for authentication of the user of user device 130 (e.g., visual or audio data to confirm the identity of the user).

Template module 108 may be configured to store and provide templates. Such templates, may, for example, be templates utilized by interactive sequences and/or operations according to the techniques described herein. The templates may be configured to be displayed as GUIs on user interface 140 of user device 130. In various embodiments, such templates may be configured with portions for insertion of questions and/or instructions for interactive sequences and/or languages. In certain such embodiments, the templates may be configured to be displayed and/or provided through other techniques, such as audio or haptic techniques (e.g., for vision challenged users). Such templates may also be configured to receive information from the user. Thus, for example, a user may interact with the template by providing text, voice, haptic, and/or other responses and the template may receive such responses and convert such responses to data usable by platform 102. Accordingly, it is appreciated that such templates of template module 108 are configured to provide information to and/or receive information from a user of user device 130.

In certain embodiments, the templates may not include their own data. For example, templates utilized for interactive sequences may be stored as blank templates within template module 108. Such a template may then be provided to interactive sequence module 110 or operation module 114 for generation of the interactive sequence to be provided to the user of user device 130.

Interactive sequence module 110 may be configured to provide interactive sequences for a user (e.g., child) of user device 130. Thus, interactive sequence module 110 may be configured to provide a full set of questions, assemble a set of questions from pre-determined questions to be provided to a user (e.g., a child), and/or generate questions or a set of questions from scratch based on, for example, machine learning. In various embodiments, interactive sequence module 110 may be configured to utilize templates stored within template module 108 to create an interactive sequence that may be provided to a user for user device 130.

In certain embodiments, interactive sequences may include questions or, additionally or alternatively, may include sequences that involve further user interaction with user device 130. For example, one interactive sequence may require the user to pronounce certain words into the microphone of user device 130, data of which may be provided to platform 102 for processing (e.g., artificial intelligence may determine how correct the pronunciation is). Another interactive sequence may require the user to utilize the camera to obtain pictures of certain items and/or to provide for an expression. The camera data is then provided to platform 102 for processing.

In certain embodiments, the interactive sequences described herein may, for example, be configured to measure a personality and emotional resilience quotient ("PERQ") of the child. Such a PERQ interactive sequence may be directed to strategic perseverance, social competence, family intimacy, emotional regulation, and/or innovation aspects of the child and may be utilized as a developmental marker for the child. Such factors may be used to calculate the PERQ. Thus, a user may answer the interactive sequence via user interface 140 of user device 130. User device 130 may then provide appropriate answer data to platform 102.

Platform 102 may receive the answer data. The answer data may be provided to capability module 112 for analysis. In certain embodiments, user device 130 may, additionally or alternatively, provide other data, such as camera data and/or voice data (which may be stored within user profile module 106) to, for example, provide authentication that the proper user in question is the one that is answering the interactive sequence as well as for analysis.

Capability module 112 may be configured to analyze answers to interactive sequences generated by interactive sequence module 110 and determine scores based on the interactive sequence answers. Thus, for example, capability module 112 may be configured to determine the PERQ of the child that answered the interactive sequence. PERQ (e.g., "Personality & Emotional Resilience Quotient") may be configured to measure a person's psychological and emotional capabilities for achieving life goals and maintaining social and family harmony.

For child-raising and education, it is generally crucial first to recognize the characteristics and traits of a child. Traditionally, intelligence based child raising approaches have measured Intelligence Quotient ("IQ"), while emotional based child raising approaches have measured Emotional Quotient ("EQ"). EQ refers to one's ability to regulate emotions appropriately and maintain harmonious interpersonal relationships. Unlike IQ, which only assesses cognitive intelligence, EQ evaluates how well individuals maintain relationships in organizational settings, such as with superiors, colleagues, and subordinates, and their contributions to teamwork, drawing significant interest from corporate leaders.

By contrast, PERQ may, for example, measure strategic perseverance, social competence, family intimacy, emotional regulation, and/or innovation/creativity. Strategic perseverance may be directed to personal efficacy, self-esteem, time management, and resilience against external distractions, characterized by "grit." Social competence may include the ability to form and maintain close relationships. Family intimacy may be directed to the ability to resolve familial conflicts and/or promote cooperation, support, and security within a family. Emotional regulation may include managing emotions effectively to maintain stability in life and learning. Innovation/creativity may include open-mindedness and enthusiasm for new experiences and activities.

The PERQ may be comparable to the IQ (Intelligence Quotient). Through testing with over 1,200 participants, including adults and students, the PERQ was standardized such that a PERQ score of 100 represents an average level of personal achievement capabilities, while a score of 120 corresponds to the top 6.4% of the population. PERQ is thus a new metric, complementing IQ, for evaluating an individual's potential for achieving personal and professional success. Responses to these questions are then received by capability module 112 and analyzed to calculate individual indices for the five domains, which are then aggregated into the overall PERQ.

The PERQ of various users may be developed. For example, operations may be provided to users to help develop their PERQ. Operation module 114 may be configured to determine or select and provide an operation sequence based on the user's PERQ. For example, operation module 114 may incorporate cognitive-behavioral therapy (CBT) and offer a plurality (e.g., hundreds, thousands, ten thousands, or more) of operation options tailored to a child's improvement needs.

In various embodiments, operation module 114 may select operations based on location data received from user device 130A and user device 130B (e.g., the user devices of a child and parent, respectively). Such location data may, for example, be positioning data such as global positioning data or determined from signal triangulation of the user devices. If operation module 114 determines, from currently received, real-time, or near real-time location data that user device 130A and user device 130B are nearby (e.g., located within a threshold distance of each other, such as 10 feet, 20 feet, or 50 feet) at a designated operation time, operation module 114 may select an appropriate collaborative mode operation and communicate operation data to user device 130A and user device 130B.

Operations may be designed based on individual characteristics, PERQ domains, and difficulty levels. Operation module 114 may analyze prior interactions (e.g., provided by biometric or other data stored within user profile module 106) to refine operation sequences, providing for personalized solutions. Such refinement may, for example, be provided by machine learning performed by operation module 114. Operations may be optimized to enhance capabilities of the child, as determined by the PERQ. Thus, the system and techniques described herein may not only measure, but also improve a child's PERQ by providing tailored operations, fostering more effective growth.

In various embodiments, the operation data communicated to user device 130A may be the same data or may be data different from that communicated to user device 130B. Thus, such data may cause user device 130A to communicate the same or different goals and/or provide the same or different guidance for completing the operation on user device 130A versus user device 130B. In various embodiments, guidance data may include, for example, Accordingly, operation module 114 may monitor the execution of selected operations, guide the child and parent during execution of the selected operations, and record the results from completion of the operations. In certain embodiments, such guidance may vary based on data received from user device 130A or user device 130B. For example, operations may involve parent-child collaboration. Operation goals and/or guidance may vary depending on whether such goals or guidance are provided to the user device associated with the child (e.g., user device 130A) or the user device associated with the parent (e.g., user device 130B). Additionally or alternatively, parents may be informed about their child's operation progress and receive tips to support their child. Operation module 114 may appropriately communicate such data to the appropriate user device for communication by the user device.

In various embodiments, operation module 114 and/or user profile module 106 may be configured to manage member information, including PERQ scores for both the child and parent (e.g., the users of user device 130A and user device 130B). Operation module 114 may also be configured to evaluate the child's emotions (e.g., from biometric data of user device 130A and/or interactive sequence answers) during or after operation execution. For example, during an operation with an objective of "learning to cook from mom," questions such as "Did you enjoy this activity?" may help assess the child's emotional state. Camera data and/or microphone data from user device 130A may also allow for the determination of the child's emotional state (e.g., based on the expression of the child or from whether the child is laughing or crying based on microphone data).

Based on the operation result and/or the determined emotions, the PERQ may be adjusted based on operation results and emotional evaluations. For instance, a high score on a family-related operation combined with positive determined emotions would increase the family intimacy index, subsequently improving the PERQ. Accordingly operation module 114 may allow for the determination and tracking of daily emotional and performance data. Based on such data, user profile module 106 may create a growth profile for the child and provide this information to the parent as part of developmental insights.

Parent module 116 may be configured to store and provide data for coordinating the parent portion of cooperative operations. In certain embodiments, parent module 116 may be configured to store data directed to certain parents. Thus, parent module 116 may provide for separate coordination and storage of data of a parent (e.g., user of user device 130B). Parent module 116 may, in certain embodiments, be configured to determine parent participation of In certain embodiments separating parent module 116 from user profile module 106 may provide for different advantages. For example, data security may be improved as child profiles may include very sensitive personal information, but parent data may include less sensitive data as the parents are not the primary targets for improvement of platform 102. Accordingly, processing resources may be more efficiently allocated to encryption and security of use profile module 106, with a less resource intensive data security structure for parent profile module 106.

Furthermore, not all operations may require parent participation and determination of quotients may not require parent data at all. Separately storing child user data may, thus, allow for more efficient searching, identification, and calculation of quotients for a child or determination of specific personal operations as such searching and processing do not require searching through parent data, which would not be useful in such an instance. Memory and processing resources may thus be conserved.

Integration module 118 may be configured to receive data, analyze data, and provide determinations based on 3rd party data (e.g., biometric data, test scores, and/or other such data). Integration module 118 may be configured to interface with electronic devices and/or database that provide such data (e.g., various other applications on user device 130) to receive such metric data and store the metric data according to the user account. As such, integration module 118 may receive data from various user devices and/or third party platforms, determine the associated account of the user on platform 102, and associate such data with the user.

The plurality of separate modules of platform 102 may provide for various advantages. For example, data security may be stored as data that would otherwise be identifying may instead be separated across different modules (which may or may not be physically separate server devices). For example, user profile module 106 may store the biographical data of a user and interactive sequence module 110 and operation module 114 may reference user profile module 106 to determine the appropriate quotient calculation or operation selection, respectively, while avoiding accessing data that is not useful for such tasks such as data stored within template module 108. Furthermore, separately storing templates and interactive sequences may allow for modification of templates that can then be propagated to all completed interactive sequences without changing the basic question determination, which is handled by interactive sequence module 110. Integration module 118 may allow for third party applications to be integrated within platform 102 and may allow for modification of integration module 118 in response to changes of such third party applications, without affecting the other modules of platform 102. Similarly, application module 104 may provide for modification of the front end application of platform 102, without affect on the other modules. Such a configuration may simplify modification of the application and may allow for a more resource and memory efficient application that is directed to obtaining the necessary data from the user without wasting resources on calculations.

In various embodiments, the capabilities and/or data of platform 102 may be accessed and/or provided to user device 180 (e.g., via communications interface 170). User device 180 may be an electronic device of a medical or clinical practitioner. Access to platform 102 may be provided via various APIs and may, for example, allow for user device 180 to access data from the various modules of platform 102 and/or memory 120. Alternatively, platform 120 may utilize memory 120 as a partitioned memory to store sensitive data; thus, while user device 180 may access platform 102, it may be prevented from accessing memory 120. Accordingly, less sensitive data may be accessed (e.g., raw sequence answers and/or operation data), but more sensitive data (e.g., identifying data) may be kept from user device 180.

User device 180 may access the data of platform 102 directly and/or may access platform 102 via a web based dashboard provided by platform 102 (e.g., for medical or clinical practitioners). Such access may allow user device 180 to receive or determine data of certain users, such as a user under the care or guidance of the practitioner. In various embodiments, user device 180 may provide authentication data (e.g., to allow platform 102 to ascertain the identity of the practitioner and/or determine that the user is actually under the care of the practitioner through, for example, confirmation by the user via user device 130, confirmation via medical records, confirmation from other third parties, and/or other such techniques). Access to such data for user device 180 may allow for the practitioner to receive data of such associated users, including data directed to the PERQ of the user, the performance of user to various operations, completion rates of various operations, various other treatments, and/or other such data described herein. In various embodiments, user device 180 may then utilize such data in other operations, such as through analytics operations performed by user device 180 or another associated device.

Additionally or alternatively, user device 180 may provide various data to platform 102, such as data that may guide, direct, and/or change the operation of various modules of platform 102, whether globally or for the specific associated user. For example, user device 180 may provide data that may modify the weights of various operations and/or change the thresholds (e.g., distance thresholds or threshold scores) associated with the user.

It is appreciated that system 100 is described as an illustrative example. Various other embodiments may include the same, different, or less modules. For example, various other embodiments may combine one, some, or all of application module 104, user profile module 106, template module 108, interactive sequence module 110, capability module 112, operation module 114, parent module 116, and/or integration module 118 into a single module.

Quotient Determination and Operation Techniques

Figure 2:
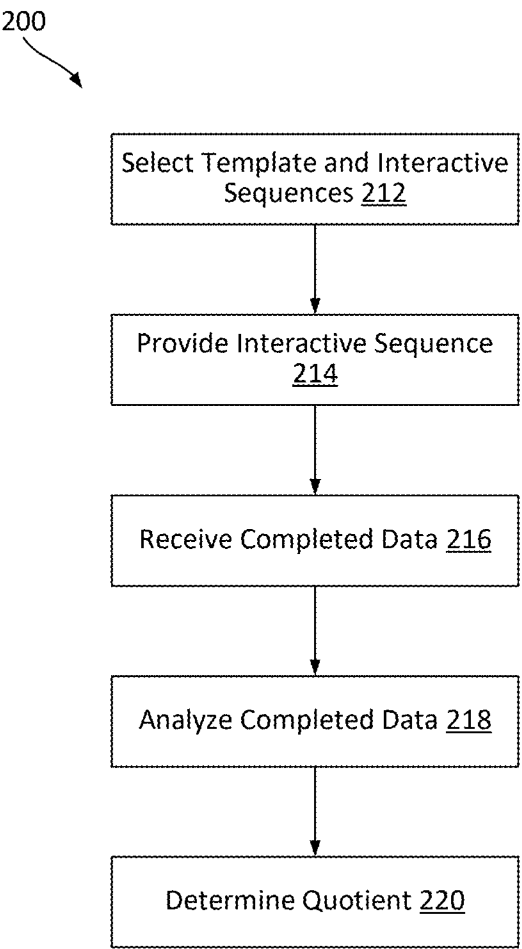
FIG. 2 is a flowchart illustrating a technique for determining an index based on a pre-determined template, in accordance with certain embodiments.

FIG. 2 is a flowchart illustrating a technique for determining an index based on a pre-determined template, in accordance with certain embodiments. FIG. 2 illustrates technique 200 for determining a PERQ of a user (e.g., a child).

In 212, the appropriate pre-set template and questions are selected (e.g., from template module 108 and interactive sequence module 110) to generate a interactive sequence for display by user interface 140A of user device 130A. For example, platform 102 may determine whether the user of user device 130A is a new user or a user that has stored historical data on platform 102 (e.g., an existing user).

In certain embodiments, the pre-set template may be a template that allows for a series of questions to be provided to the user of user device 130A (e.g., may include a plurality of GUIs that communicates such questions). Each GUI may include a portion for providing the questions of the interactive sequences to the user. Additionally, the GUI may include a portion for receiving user feedback. Other embodiments may provide the questions or receive feedback via other techniques additional or alternative to visual techniques, such as via sound or haptic feedback.

Based on whether platform 102 includes stored user information, the appropriate template and/or questions may be selected. For example, a new user may be provided with a full set of questions or a set of questions for an initial PERQ assessment. A user that has interacted with platform 102 (e.g., performed one or more operations) may be provided with a interactive sequence that is a follow-up questionnaire, to determine the effects of the operation. In certain embodiments, a single pre-set template may be utilized for a plurality of different types of interactive sequences (e.g., onboarding and follow-up questionnaires may both utilize the same pre-set template).

In certain such embodiments, the interactive sequence may be directed to assessing one, some, or all of these five domains, producing indices that collectively define the PERQ. For example, the interactive sequence may include questions such as: (1) I find it difficult to plan for upcoming events. (2) I tend to be quiet. (3) I enjoy spending time with my family. (4) I have a generous personality. (5) Before taking action, I carefully consider the consequences. In certain embodiments, each question may correspond to one or multiple indices. For example, the question "I enjoy spending time with my family" may primarily reflect family intimacy but may also relate to social competence.

The created interactive sequence is provided to user device 130A in 214 for communication by user device 130A to the user. User device 130A may provide such questions to the user (e.g., child) and receive responses to the questions. Data associated with these question responses are then provided by user device 130A to platform 102. Responses to these questions are then received by platform 102 in 216.

In 218, the responses to the completed question data may be analyzed to calculate individual indices of and/or the complete PERQ. For example, each of the five domains of the PERQ may be determined from the completed question data. Thus for example, individual scores may be determined for each of the five domains and the individual domain scores may then be weighted. The weighted scores may then be aggregated into the overall PERQ. Other embodiments may determine the PERQ from directly from completed question data. Thus, for example, each question may be weighted in a calculation of the PERQ. The PERQ may then be determined in 220.

Figure 3:
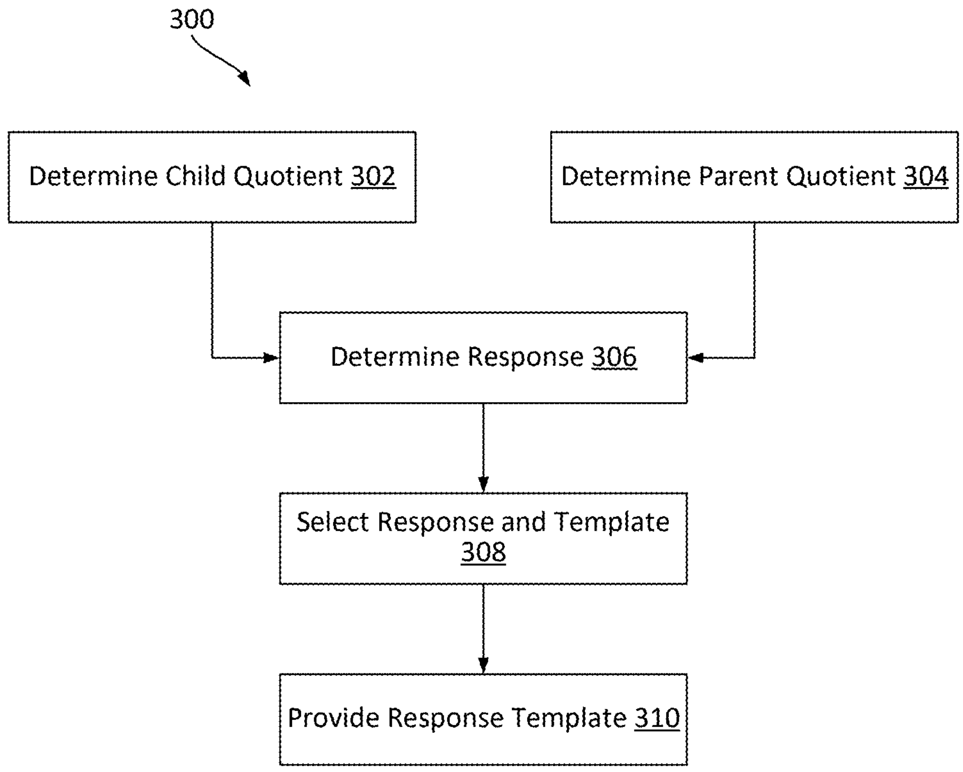
FIG. 3 is a flowchart illustrating a technique for selecting and providing a pre-determined template, in accordance with certain embodiments.

FIG. 3 is a flowchart illustrating a technique for selecting and providing a pre-determined template, in accordance with certain embodiments. FIG. 3 illustrates technique 300 for providing a response from platform 102 based on the determined PERQ.

In 302 and 304, the PERQ of the child and parent may be determined, according to the techniques described herein. The child and parent PERQ may be determined according to the same questions or different questions. Based on the determined PERQ or the individual components of the calculated PERQ, platform 102 may determine an appropriate response in 306. The response may be, for example, an operation for execution by the users (e.g., an operation utilizing user device 130A and/or user device 130B).

Based on the selected operation, a response template may be selected in 308. The response template may be a pre-set template, according to the techniques described herein. The appropriate response may also be selected in 308. In various embodiments, the appropriate response may be, for example, an operation for execution by the user(s) of user device 130A and/or user device 130B. Data directed to the appropriate response, e.g., operation, may be combined with the pre-set template for presentation by a user device.

The response may be presented to the appropriate user device in 310. Such response data may, for example, be communicated to a user device for a user interface of the user device to communicate an operation for execution by the user of the user device. Accordingly, when the user device receives the response data, the user device may communicate data directed to the response to a user of the user device. Such communication may be provided immediately, with a time delay, or in response to a user input on the user device.

Systems and Techniques for Improvements

Figure 4:
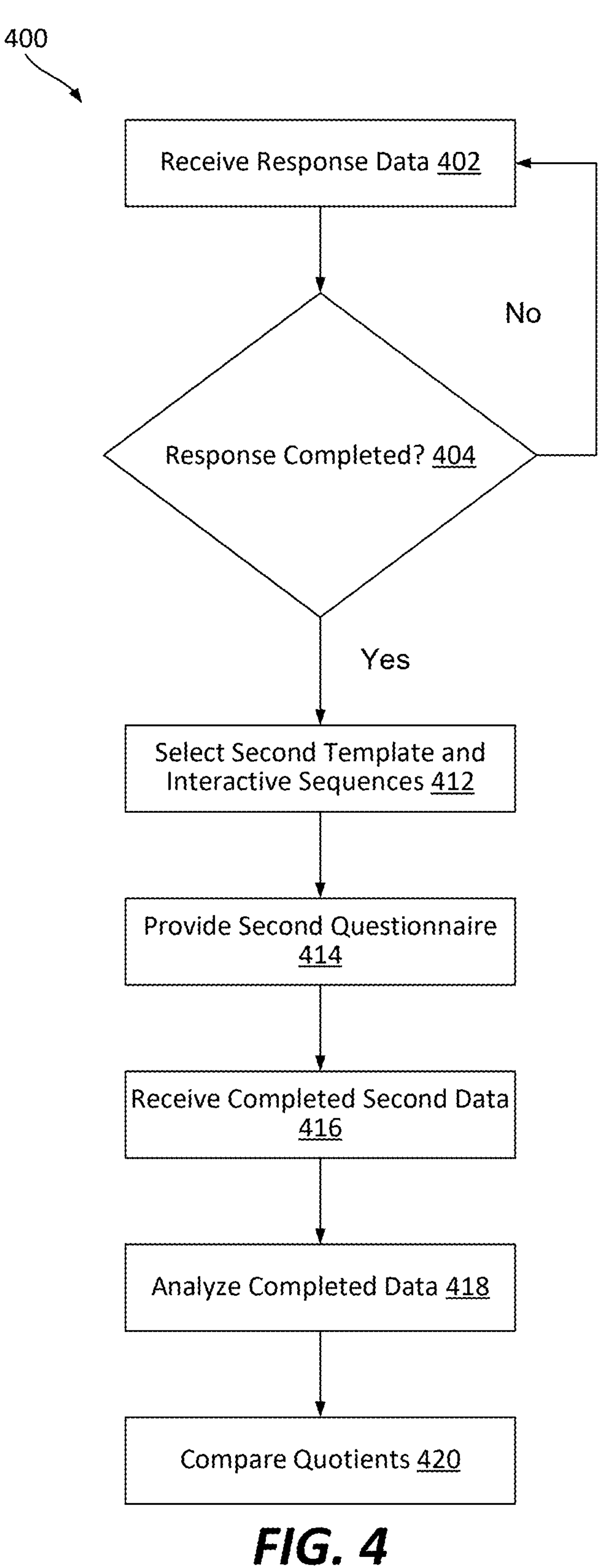
FIGS. 4-6 are flowcharts illustrating techniques for operating electronic device guidance data assisted operations, in accordance with certain embodiments.
Figure 5:
Figure 5:
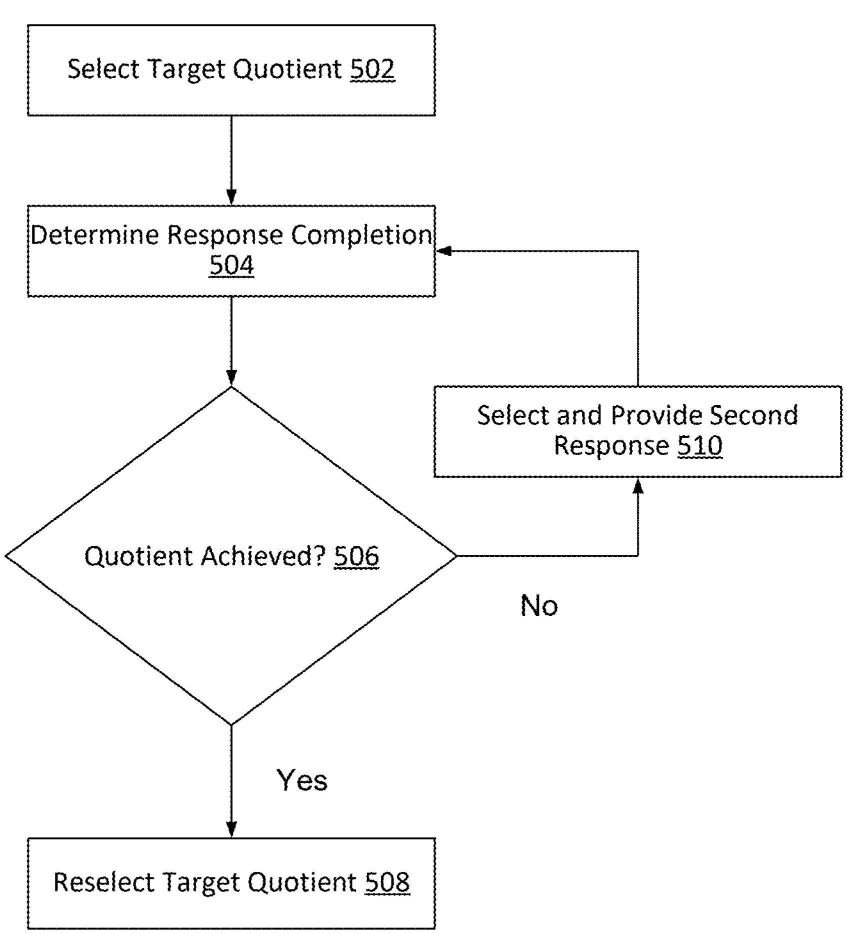
Figure 6:
Figure 6:
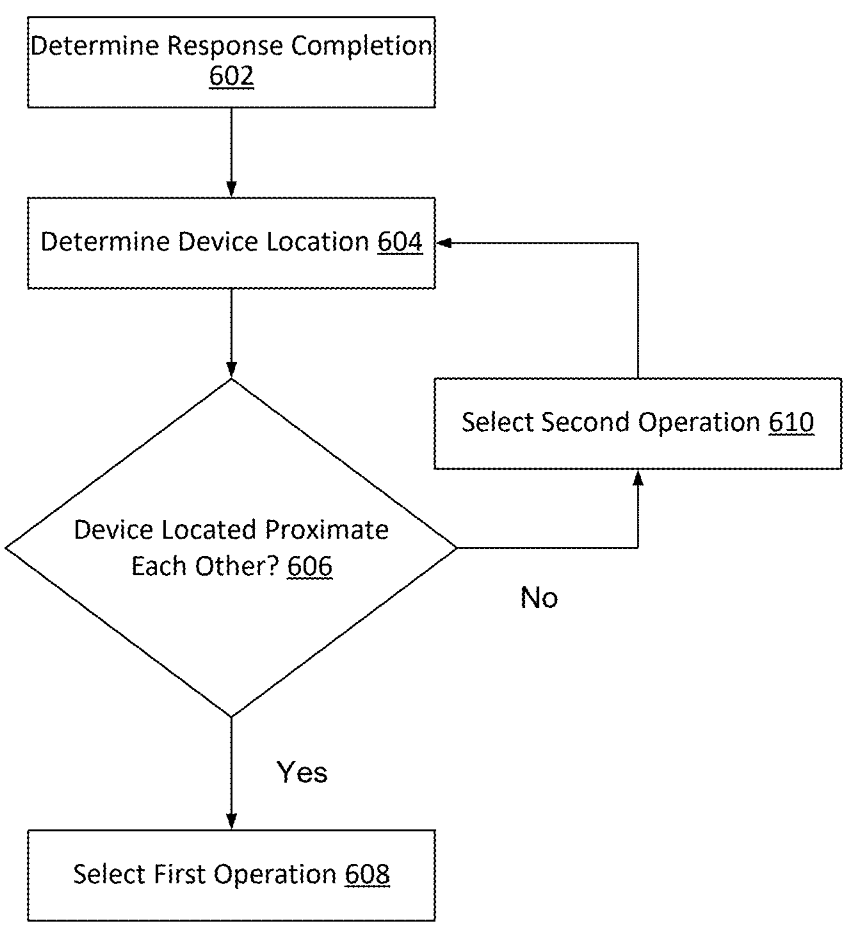

FIGS. 4-6 are flowcharts illustrating techniques for operating electronic device guidance data assisted operations, in accordance with certain embodiments. FIG. 4 illustrates technique 400 for determining the effectiveness of certain operations on the user of the user device.

In 402, response data from the user device may be received. In various embodiments, such operations may be, for example, a collaborative effort between child and parent, a child operation, a parent operation, and/or another such type of operation. In certain embodiments, the operation may require the use of a user device to complete. The response data may be, for example, data provided by one or more user devices in accordance with performance of an operation. For example, the user device may determine and provide operation data, such as completion of the issues, elapsed time, whether certain steps are performed within a threshold period of time or out of a threshold period of time, the number of attempts at a certain step, biometric data, camera data, audio data, and/or other such data to allow for the determination of the progress of the operation as well as the emotional state of the user during performance of the issue.

Based on the response data, platform 102 may determine whether the response (e.g., the operation) has been completed in 404. For example, the operation may include one or more objectives and, based on response data received, platform 102 may determine whether the objectives have been fulfilled. Thus, for example, response data may include camera data providing a picture of a cake baked by parent or child or video of the baking of the cake. Based on such data, platform 102 may determine that the operation has been fulfilled. An additional example may include an operation that includes a request for a parent to write a message wishing a child to have a good day and completing delivery of the message via a built-in messaging application of platform 102 (e.g., an application loaded onto an application on user device 130) to promote family intimacy. Based on such data, platform 102 may determine that the operation has been successfully completed.

If the operation has not been fulfilled, the technique continues in 402. In certain embodiments, platform 102 (e.g., via operation module 114) may provide guidance data to one or more user devices to aid in the performance of the operation. Thus, for example, user device 130A and/or user device 130B may provide data indicating that the user is struggling with a certain step of the operation. For example, user device 130A and/or user device 130B may receive a user input indicating that the user is struggling with the operation. Additionally or alternatively, user device 130A and/or user device 130B may provide other data, such as camera or video data indicating unhappy facial expressions, audio data of sounds of frustration, location data indicating the user is in the wrong location, biometric data indicating a raised heart rate, and/or other such data associated with frustration and/or difficulty with accomplishing the operation.

Operation module 104 may receive such data and determine the portion that the user is struggling with and/or the reasons for the user's struggles. Operation module 104 may then accordingly provide guidance data to user device 130A and/or user device 130B to aid in the execution of the operation. In various embodiments, such guidance data may be pre-set guidance stored by operation module 104 (e.g., common points of struggle and guidance for overcoming those points), may be guidance generated by operation module 104, and/or may be other such types of guidance. Such guidance data may allow for a user to more likely or more easily fulfill the operation.

If the operation has been fulfilled the technique proceeds to 412. A further pre-set template and set of questions is selected in 412, similar to the technique described for 212. A second interactive sequence may be created from the template and interactive sequence data. In various embodiments, the second interactive sequence may include the same or some or completely different content or a different order of items from the previous interactive sequence.

The second interactive sequence may be provided, in 414, similar to the technique described for 214. The user device may then present the second interactive sequence and the user of the user device may fill out the second interactive sequence. The response data from the answers to the second interactive sequence may then be provided in 416, similar to the technique described for 216.

The response data may be analyzed in 418, similar to the technique described for 218, and a new or updated quotient (e.g., PERQ) may be determined. The new or updated quotient may then be compared to the previously determined quotient in 420. Differences in the PERQ may indicate growth within the user. In certain embodiments, a further operation may be selected based on the differences in determined PERQ. For example, an operation corresponding to a secondary achievement competency index may be determined, but the operation sequence of the operation may be varied based the amount of growth measured in 420.

FIG. 5 illustrates technique 500 for determining development of various component sub-quotients of a quotient (e.g., PERQ). In 502, a target quotient may be selected. The target quotient may be, for example, the full PERQ or a sub-quotient of the PERQ (e.g., the sub-quotient directed towards innovation). Based on the target quotient, operation module 114 may select or generate the appropriate operation for development of the target quotient. Thus, for example, operation module 114, to improve innovation, operation module 114 may select operations directed towards allowing a child to utilize user device 130A in creative manners, such as taking cameras are weird angles, utilizing the GPS of the user device to, for example, cause the user device to become a pirate map, and/or other such operations. The user may perform such operations and platform 102 may determine whether such operations have been completed, in 504, according to the techniques described herein. Upon completion of the operation, the index or the PERQ may be scored again.

Repeated operations and/or operation executions directed towards the target index (e.g., for improving scores of the target index) may be repeated until a threshold score or threshold level of improvement has been reached in 506. If the threshold score or improvement has not been reached in 506, a further response, such as a different operation directed to improving the target quotient or a different quotient for improvement, may be selected and provided for completion in 510.

If the threshold score or improvement has been reached, the technique may proceed to 508, the target quotient may be reselected as the efficacy of the operation or type of operation may be proven. The same operation or another operation directed to improving the selected target quotient may then be selected and provided.

FIG. 6 illustrates technique 600, which may be a technique for performing user device operations according to determined locations of the parent and child user devices. Such an operation may, for example, be a cooperative operation between parent and child that utilizes the determined locations of user device 130A and user device 130B in selecting and/or executing an operation.

In 602, upon determining a completion of a previous operation, platform 102 may determine the locations of both user device 130A and user device 130B in 604. For example, location data provided by GPS receivers and/or signal triangulation of user device 130A and user device 130B may be utilized to determine such locations. Additionally or alternatively, user device 130A and user device 130B may be in communication with each other (e.g., via a Bluetooth connection) and one or both of user device 130A and user device 130B may provide data to platform 102 indicating that the user devices are in communication. A determination is then made as to whether user device 130A and user device 130B are disposed within a threshold distance of each other, in 606.

If user device 130A and user device 130B are not disposed within the threshold distance, a personal mode operation may be selected and provided in 610. The personal mode operation may be provided to user device 130A as well as, in certain embodiments, user device 130B. Accordingly, the personal mode operation may include both child operations and parent operations. In certain embodiments, a child operation may be selected and a corresponding parent operation may then be determined and selected based on the selected child operation. During performance of the operation, platform 102 may periodically determine the progress of the operation and provide guidance data to aid in the performance of the operation.

Conversely, if user device 130A and user device 130B are disposed within the threshold distance, a collaborate mode operation may be selected and provided in 608. Such a collaborative mode operation may require both users of user device 130A and user device 130B to perform components of the operation. For example, for an operation with an operation goal of "Speak confidently," the personal operation for the child (e.g., user of user device 130A) may be "Debate a Topic with AI on your smartphone (e.g., user device 130A)," while the collaborative operation might be "Record a discussion with your dad."

Accordingly, operation module 114 may classify operation data as being directed to collaborative or personal mode operations. Operation module 114 may then select and provide such operations based on the determined situation, such as the determined location of the child and parent user devices, allowing for a more diverse range of operations and enhancing their effectiveness.

In certain embodiments, the operations may be selected and provided based on the currently determined time and location of the child and parent user devices. Other embodiments may provide for predetermined types of operations. For collaborative mode operations, platform 102 may continue to receive location data from user device 130A and user device 130B during execution of the operation to verify location data and verify that the operations are being jointly executed.

Figure 7:
FIG. 7 is a flowchart illustrating utilizing sensor data from an electronic device for determining personality and emotional resilience, in accordance with certain embodiments.
Figure 7:
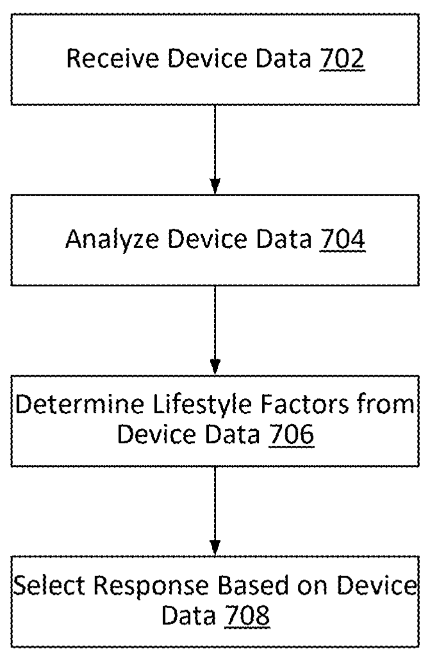

FIG. 7 is a flowchart illustrating utilizing sensor data from an electronic device for determining personality and emotional resilience, in accordance with certain embodiments. FIG. 7 illustrates technique 700 that utilizes data from user devices to allow for platform 102 to determine lifestyle patterns of a child and parent to aid in the selection of operations.

Accordingly, in 702, device data from user device 130A and/or user device 130B may be received. Such device data may include data directed to lifestyle patterns of the child and parent.

Platform 102 may analyze such data in 704 and determine lifestyle factors from such data in 706. Such data may include, for example, data indicating periodic location changes, user device usage history (including usage times and used applications), and/or other relevant data that allows for the indication of lifestyle patterns. Such lifestyle patterns include, for example, time spent at home, primary times of electronic device usage, and shared time between the parent and child.

In 708, based on such determined lifestyle patterns, a suitable operation sequence may be determined to be effective in increasing a target quotient. For instance, the analysis may determine when the child and parent are usually together, when the child is typically at home, and how time is allocated for school and extracurricular activities. Based on this analysis, appropriate operations may be selected and provided. Lifestyle data may also allow for the determination that the child is typically more engaged with electronic devices in the morning and, thus, operations utilizing user device 130A may be provided for execution during mornings.

Figure 8:
FIG. 8 is a flowchart illustrating a technique for providing electronic device operation tracking, in accordance with certain embodiments.
Figure 8:
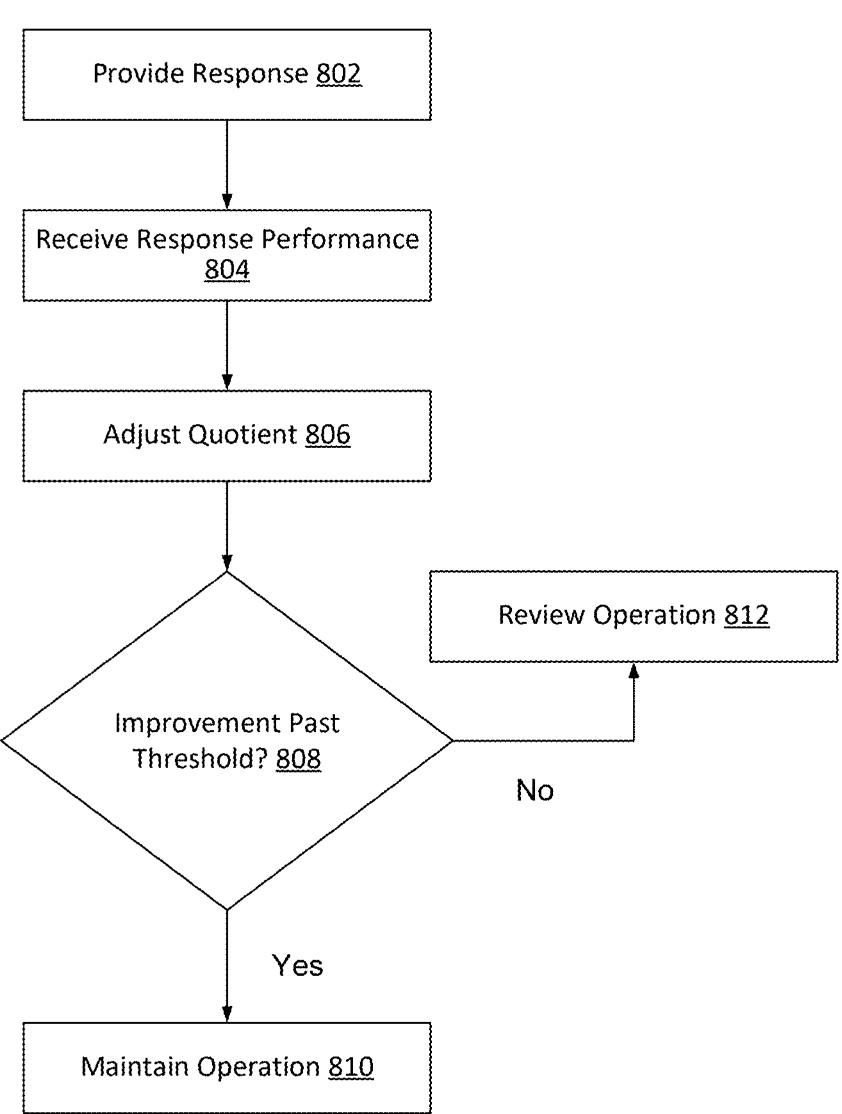

FIG. 8 is a flowchart illustrating a technique for providing electronic device operation tracking, in accordance with certain embodiments. FIG. 8 illustrates technique 800, which may be a technique of a management process after operation execution.

In 802, a response may be provided for improvement of a quotient of the child. Such a response may include, for example, one or more operations or questionnaires for performance by the child and/or parent, according to the techniques described herein. The child and/or parent may perform the operation or answer the questionnaire in 804, according to the techniques described herein. Operation execution may be scored based on various criteria, such as how quickly the operation was initiated, the total time taken to complete the operation, and an analysis of the content from the execution of the operation.

Based on 804, the quotient or appropriate sub-quotient may be adjusted in 806, according to the techniques described herein. As described above, the quotient (e.g., a child's PERQ) may change based on operation execution. Platform 102 may be configured to manage the child's PERQ score and corresponding change the operation sequence that is appropriate for the child. Platform 102 may, thus, determine whether a set of responses has improved a quotient past a threshold in 808. Platform 102 may, thus, measure the effectiveness of a provided operation sequence and/or determine how much the operation sequence contributes to changes in the quotient.

If the quotient indicates improvement beyond the threshold, platform 102 may determine that the current operation sequence and corresponding operations are appropriate. Thus, the operation sequence is maintained in 810 and, in certain embodiments, the same operation or another operation in the operation sequence may be provided. The child's growth information may also be provided to the parent's user device (e.g., user device 130B).

If the quotient improvement is below the threshold, the operation sequence and associated operations may be reviewed (e.g., by capability module 112 and/or operation module 114) and, if necessary, modified in 812. In certain embodiments, if the change in quotient differs significantly from the initial measurement beyond a threshold value, a remeasurement of the quotient may be conducted (e.g., a further interactive sequence may be provided). As such, platform 102 may predict quotient changes based on operation execution and responses to related questions. When the determined change differs from the predicted change by a threshold amount, the quotient may be remeasured.

Device Examples

Figure 9:
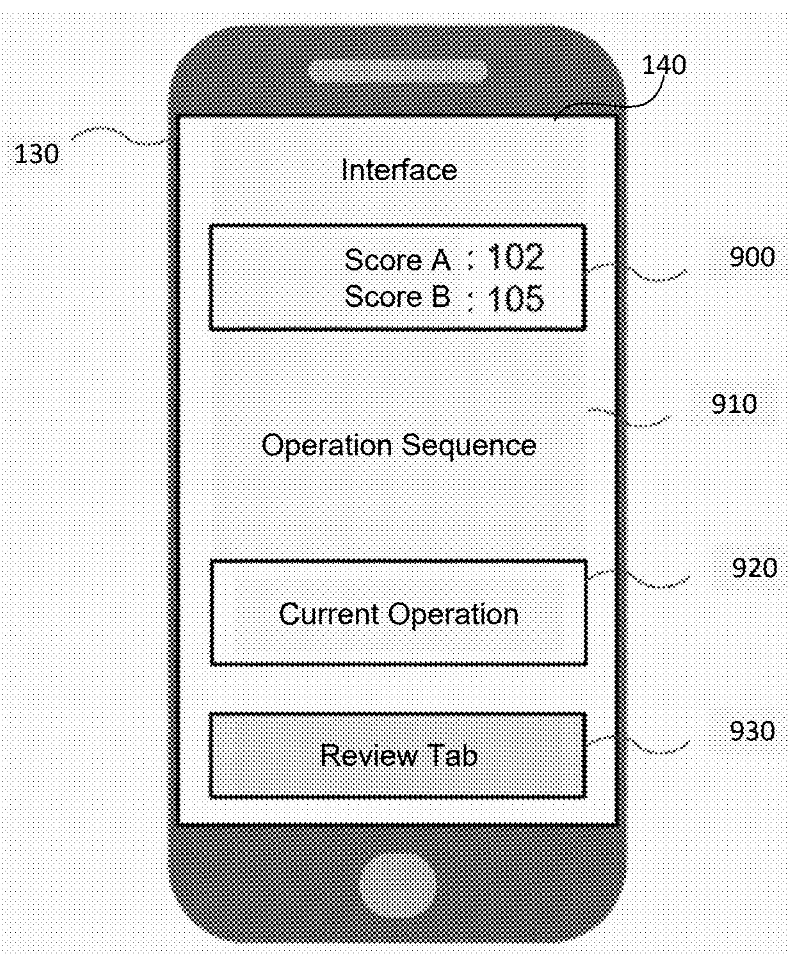
FIG. 9 illustrates an electronic device graphical user interface (GUI), in accordance with certain embodiments.

FIG. 9 illustrates an electronic device graphical user interface (GUI), in accordance with certain embodiments. FIG. 9 illustrates user device 130 with user interface 140. User interface 140 may be a GUI in accordance with a pre-set template. Thus, user interface 140 may include quotient portion 900, operation sequence portion 910, current operation portion 920, and review tab portion 930. It is appreciated that user interface 140 may be configured to provide data to a child user or to a parent user on the progress of their child.

Quotient portion 900 may indicate one or more quotients or sub-quotients for a parent or child. Operation sequence portion 910 may provide details of an operation sequence, such as an overall goal or quotient for improvement for the sequence. Current operation portion 920 may provide details as to the current operation for the user or child (e.g., the daily operation). Review tab portion 930 may, for parent users, be a tab that a parent user may select check for operations that have performed (either by the parent or child) or need to be performed.

Figure 10:
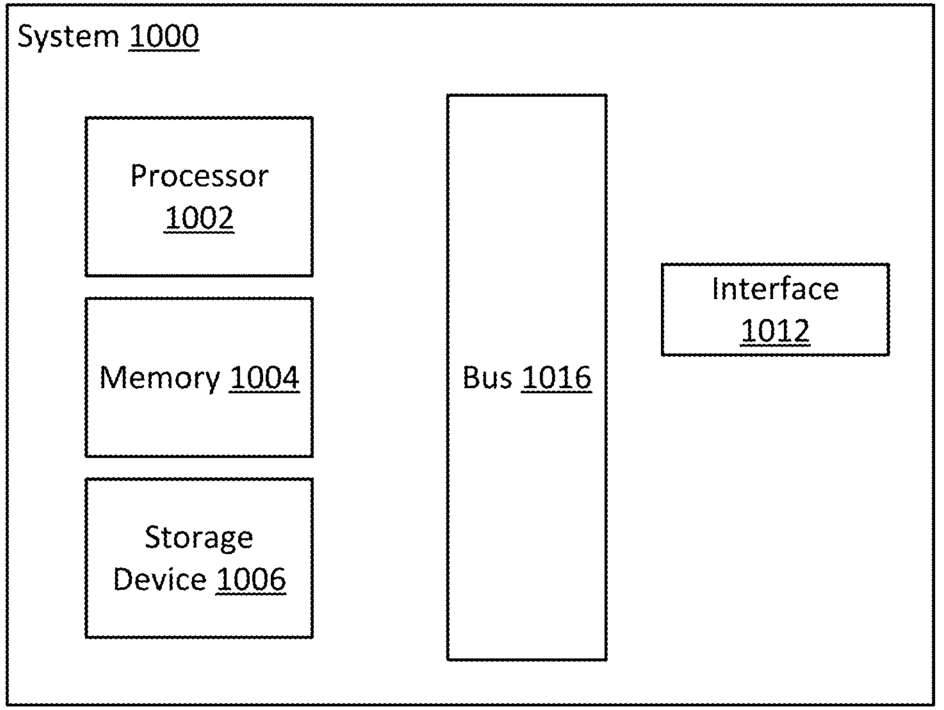
FIG. 10 illustrates a block diagram of an example computing system, in accordance with certain embodiments.

FIG. 10 illustrates a block diagram of an example computing system, in accordance with certain embodiments. According to various embodiments, a system 1000 suitable for implementing embodiments described herein includes a processor 1002, a memory module 1004, a storage device 1006, an interface 1012, and a bus 1016 (e.g., a PCI bus or other interconnection fabric.) System 1000 may operate as variety of devices such as a server system such as an application server and a database server, a client system such as a laptop, desktop, smartphone, tablet, wearable device, set top box, etc., or any other device or service described herein.

Although a particular configuration is described, a variety of alternative configurations are possible. The processor 1002 may perform techniques such as those described herein. Instructions for performing such techniques may be embodied in the memory 1004, on one or more non-transitory computer readable media, or on some other storage device. Various specially configured devices can also be used in place of or in addition to the processor 1002. The interface 1012 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and techniques described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process techniques have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. A system comprising:

a device coordinator platform, comprising:

a template module, configured to store one or more pre-set templates;

an operation module, configured to:

receive first real-world location data from a first user device;

receive second real-world second location data from a second user device associated with the first user device;

determine that the first user device and the second user device are disposed within a threshold distance of each other;

select, based on determining that the first user device and the second user device are disposed within the threshold distance, a collaborative mode, wherein the collaborative mode is configured to require a first user, with the first user device, and a second user, with the second user device, to perform different components of an operation sequence;

an interactive sequence module, configured to:

access, based on the collaborative mode selection, the template module to obtain a first pre-set template, the first pre-set template associated with the collaborative mode;

create a first interactive sequence, based on the first pre-set template;

provide the first interactive sequence to a first user device, the first user device comprising a first user interface, wherein the first interactive sequence comprises a first test sequence configured to receive a first test response from the first user via a microphone of the first user device and a second test sequence configured to receive a second test response from the first user via a camera of the first user device;

receive first interactive reply data from the first user device based on the first interactive sequence; and a capability module, configured to:

determine, based on the first interactive reply data and utilizing artificial intelligence, a first performance score associated with the first user associated with the first user device; and an operation module, configured to:

determine, based on the first performance score, a first operation sequence, wherein the first operation sequence comprises a first child operation sequence and a first parent operation sequence, wherein the first child operation sequence is configured to be executed by the first user interacting with the camera and/or the microphone of the first user device in the collaborative mode while located within the threshold distance from the second user device, and wherein the first parent operation sequence is configured to be executed by the second user interacting with the second user device in the collaborative mode while located within the threshold distance from the first user device;

provide first child operation sequence data to the first user device, the first child operation sequence data configured to indicate the first child operation sequence on the first user device;

provide first parent operation sequence data to the second user device, the first parent operation sequence data configured to indicate the first parent operation sequence on the second user device;

receive, from the first user device during a first time period, first child operation data based on the first user executing the first child operation sequence with the first user device, the first child operation data comprising data generated by the first user interface and one or more of camera data generated by the camera of the first user device, microphone data generated by the microphone of the first user device, and/or biometric sensor data generated by a biometric sensor of the first user device;

determine, from the first child operation data, a first child operation result and a first child emotional result associated with the first user performing the first child operation sequence, wherein first child operation result is associated with performance of a first goal of the first child operation sequence, and wherein the first child emotional result is a determination of a first emotion of the first user based on artificial intelligence utilizing the camera data, the microphone data, and/or the biometric sensor data received during the first time period, and wherein the artificial intelligence is configured to assign an increased confidence in the determination of the first emotional result based on determining the first emotional result based on a higher number of data sources, the data sources comprising the camera data, the microphone data, and/or the biometric sensor data;

continue receiving first real-world location data from the first user device and second real-world location data from the second user device associated with the first user device;

verify, based on the first real-world location data and the second real-world location data, that the first user device and the second user device continue to be located within the threshold distance from each other;

determine, based on the first operation child result and the first child emotional result, a second child operation sequence, wherein the second child operation sequence is configured to be executed by the first user interacting with the camera and/or the microphone of the first user device in the collaborative mode while located within the threshold distance from the second user device;

provide second child operation sequence data to the first user device, the second child operation sequence data configured to indicate the second child operation sequence on the first user device;

receive, from the first user device during a second time period, second child operation data based on the first user executing the second child operation sequence with the first user device, the second child operation data comprising data generated by the first user interface and one or more of the camera, the microphone, and/or a biometric sensor of the first user device;

determine, from the second child operation data, a second child operation result and a second child emotional result associated with the first user performing the second child operation sequence, wherein the second child operation result is associated with performance of a second goal of the second child operation sequence, and wherein the second child emotional result is a determination of a second emotion of the first user based on artificial intelligence utilizing the camera data, the microphone data, and/or the biometric sensor data during the second time period, and wherein the artificial intelligence is configured to assign an increased confidence in the determination of the second emotional result based on determining the second emotional result based on a higher number of data sources, the data sources comprising the camera data, the microphone data, and/or the biometric sensor data;

determine, based on the first emotional result and the second emotional result, a trend of the first emotional result and the second emotional result of the first user performing the first operation sequence and the second operation sequence; and adjust, based on the trend, further operation sequences to be provided to the first user device.

2. The system of claim 1, wherein the first interactive sequence is configured to cause the first user interface to communicate the first interactive sequence.

3. The system of claim 1, wherein the first child operation data is stored within the operation module to aid in determination of further operation sequences.

4. The system of claim 1, wherein:

the operation module is further configured to:

provide the first child operation result and the first child emotional result to the capability module; and the capability module is further configured to:

determine, based on the first child operation result and the first child emotional result, a second performance score associated with the first user.

5. A method comprising:

storing one or more pre-set templates within a template module;

receiving, with an operation module, first real-world location data from a first user device;

receiving, with the operation module, second real-world second location data from a second user device associated with the first user device;

determining, with the operation module, that the first user device and the second user device are disposed within a threshold distance of each other;

selecting, with the operation module, based on determining that the first user device and the second user device are disposed within the threshold distance, a collaborative mode, wherein the collaborative mode is configured to require a first user, with the first user device, and a second user, with the second user device, to perform different components of an operation sequence;

accessing, with an interactive sequence module, the template module to obtain a first pre-set template, the first pre-set template associated with the collaborative mode;

creating, with the interactive sequence module, a first interactive sequence based on the first pre-set template;

providing the first interactive sequence to a first user device, the first user device comprising a first user interface, wherein the first interactive sequence comprises a first test sequence configured to receive a first test response from the first user via a microphone of the first user device and a second test sequence configured to receive a second test response from the first user via a camera of the first user device;

receiving first interactive reply data from the first user device based on the first interactive sequence;

determining, based on the first interactive reply data and utilizing artificial intelligence, a first performance score associated with a first user associated with the first user device;

determining, based on the first performance score, a first operation sequence, wherein the first operation sequence comprises a first child operation sequence and a first parent operation sequence, wherein the first child operation sequence is configured to be executed by the first user interacting with the camera and/or the microphone of the first user device in the collaborative mode while located within the threshold distance from the second user device, and wherein the first parent operation sequence is configured to be executed by the second user interacting with the second user device in the collaborative mode while located within the threshold distance from the first user device;

providing first child operation sequence data to the first user device, the first child operation sequence data configured to indicate the first child operation sequence on the first user device;

providing first parent operation sequence data to the second user device, the first parent operation sequence data configured to indicate the first parent operation sequence on the second user device;

receiving, from the first user device during a first time period, first child operation data based on the first user executing the first child operation sequence with the first user device, the first child operation data comprising data generated by the first user interface and one or more of camera data generated by the camera of the first user device, microphone data generated by the microphone of the first user device, and/or biometric sensor data generated by a biometric sensor of the first user device;

determining, from the first child operation data, a first child operation result and a first child emotional result associated with the first user performing the first child operation sequence, wherein first child operation result is associated with performance of a first goal of the first child operation sequence, and wherein the first child emotional result is a determination of a first emotion of the first user based on artificial intelligence utilizing the camera data, the microphone data, and/or the biometric sensor data received during the first time period, and wherein the artificial intelligence is configured to assign an increased confidence in the determination of the first emotional result based on determining the first emotional result based on a higher number of data sources, the data sources comprising the camera data, the microphone data, and/or the biometric sensor data;

continue receiving first real-world location data from the first user device and second real-world location data from the second user device associated with the first user device;

verifying, based on the first real-world location data and the second real-world location data, that the first user device and the second user device continue to be located within the threshold distance from each other;

determining, based on the first operation child result and the first child emotional result, a second child operation sequence, wherein the second child operation sequence is configured to be executed by the first user interacting with the camera and/or the microphone of the first user device in the collaborative mode while located within the threshold distance from the second user device;

providing second child operation sequence data to the first user device, the second child operation sequence data configured to indicate the second child operation sequence on the first user device;

receiving, from the first user device during a second time period, second child operation data based on the first user executing the second child operation sequence with the first user device, the second child operation data comprising data generated by the first user interface and one or more of the camera, the microphone, and/or a biometric sensor of the first user device;

determining, from the second child operation data, a second child operation result and a second child emotional result associated with the first user performing the second child operation sequence, wherein the second child operation result is associated with performance of a second goal of the second child operation sequence, and wherein the second child emotional result is a determination of a second emotion of the first user based on artificial intelligence utilizing the camera data, the microphone data, and/or the biometric sensor data during the second time period, and wherein the artificial intelligence is configured to assign an increased confidence in the determination of the second emotional result based on determining the second emotional result based on a higher number of data sources, the data sources comprising the camera data, the microphone data, and/or the biometric sensor data;

determining, based on the first emotional result and the second emotional result, a trend of the first emotional result and the second emotional result of the first user performing the first operation sequence and the second operation sequence; and adjusting, based on the trend, further operation sequences to be provided to the first user device.

6. The method of claim 5, wherein the first interactive sequence is configured to cause the first user interface to communicate the first interactive sequence.

7. The method of claim 5, wherein the first child operation data is stored within an operation module to aid in determination of further operation sequences.

8. The method of claim 1, further comprising:

providing the first child operation result and the first child emotional result to a capability module; and determining, based on the first child operation result and the first child emotional result, a second performance score associated with the first user.

9. The system of claim 1, wherein the operation module is further configured to:

determine, from the first child emotional result, that first user is struggling with the first operation sequence; and provide, based on the verifying that the first user device and the second user device continue to be located within the threshold distance from each other and the determining that the first user is struggling with the first operation sequence, first guidance data to the first user device, wherein the first guidance data is configured to aid in execution of the first operation sequence.

10. The system of claim 1, wherein the second operation sequence is configured to provide a second user response to the first user performing the first operation sequence.

11. The system of claim 1, wherein the operation module is further configured to:

receive first parent operation data from the second user device; and determine, based on the first child operation data and the second child operation data while verifying that the first user device and the second user device continue to be located within the threshold distance from each other, successful completion of the first operation sequence.

12. The system of claim 1, wherein the threshold distance is 50 feet or less.

13. The method of claim 5, further comprising:

determining, from the first child emotional result, that first user is struggling with the first operation sequence; and providing, based on the verifying that the first user device and the second user device continue to be located within the threshold distance from each other and the determining that the first user is struggling with the first operation sequence, first guidance data to the first user device, wherein the first guidance data is configured to aid in execution of the first operation sequence.

14. The method of claim 5, wherein the second operation sequence is configured to provide a second user response to the first user performing the first operation sequence.

15. The method of claim 5, further comprising:

receiving first parent operation data from the second user device; and determining, based on the first child operation data and the second child operation data while verifying that the first user device and the second user device continue to be located within the threshold distance from each other, successful completion of the first operation sequence.

16. The method of claim 5, wherein the threshold distance is 50 feet or less.

* * * * *